June 29, 1937. E. W. G. PATERSON 2,085,469
BEAM STRUT AND BRAKE LEVER SUPPORT
Filed March 15, 1935
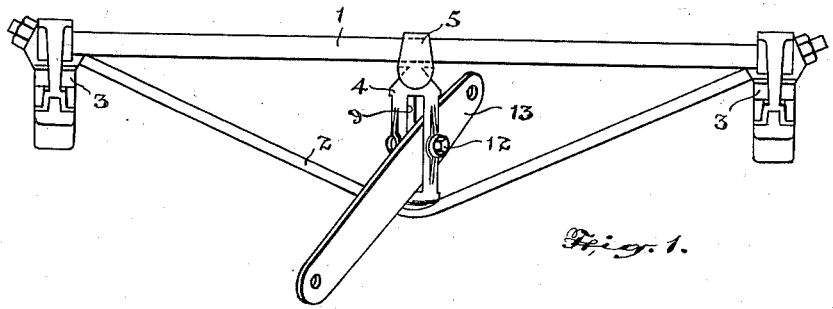
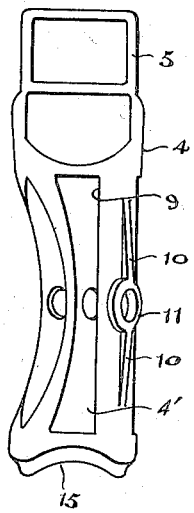
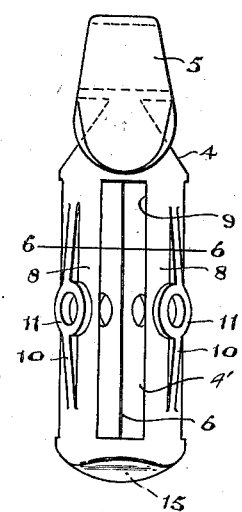
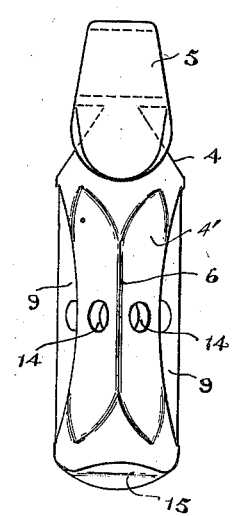
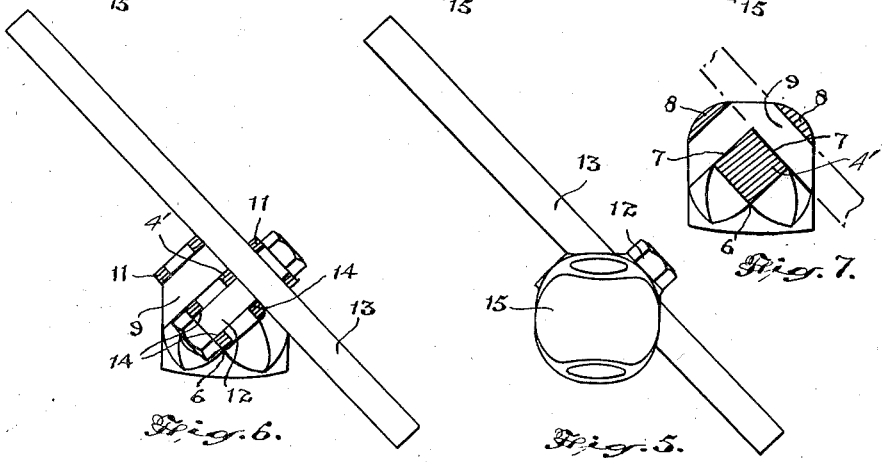
Inventor:
Earle W. G. Paterson.

Patented June 29, 1937

2,085,469

UNITED STATES PATENT OFFICE 2,085,469

BEAM STRUT AND BRAKE LEVER SUPPORT

Earle W. G. Paterson, Lindsay, Ontario, Canada, assignor of one-half to Robert W. Davis and one-half to George W. Cable, Toronto, Ontario, Canada Application March 15, 1935, Serial No. 11,197

1 Claim. (Cl. 188—232)

The principal objects of this invention are to provide a brake beam strut for railway cars, which will enable the placing of the brake lever in a right or left hand position, without altering the position of the strut, and to provide a strut of a very rigid construction, which may be easily and quickly placed in position and will support the beam tie rod in its required relation to the beam.

The principal feature of the invention consists in the novel construction of an unitary strut casting formed with a pair of right angularly arranged longitudinal slots, opening centrally through the top of the strut in which the live brake lever of the car equipment is placed, and in the arrangement of longitudinal supports each side of the lever to carry the pivot bolt on which the lever is fulcrumed, the strut having a rectangular box shaped end to fit over the brake beam, and a recessed opposite end to receive the strut tie bar.

In the accompanying drawing, Figure 1 is a plan view of a brake beam showing the application of my improved strut with the brake lever arranged therein.

Figure 2 is an enlarged plan view of the strut.

Figure 3 is an enlarged side elevational view of the strut.

Figure 4 is an enlarged bottom side plan view of the strut.

Figure 5 is an enlarged end view of the strut showing the brake lever in position.

Figure 6 is an enlarged cross section through the strut on the line of the pivot bolt for the brake lever, and showing the brake lever in position.

Figure 7 is a cross section of the strut through the line 6—6 of Figure 2, showing the brake lever in position.

Numerous forms of struts for brake beams have been proposed with the object of permitting the brake lever to be mounted therein in a right or left position. That is to say, so that the live brake lever is arranged to slant upwardly either to the left or to the right to accommodate the particular arrangement of the automatic brake cylinder on the car. Many of such devices that have been proposed are extremely cumbersome and it is the particular purpose of this invention to provide a strut which will not only be very efficient in use, but may be handled with ease.

Brake beams as at present used, comprise a channel beam 1, and an angled brace rod 2, the ends of which are secured in brake shoe heads 3, mounted on the ends of the beam 1. The strut 4 is arranged at the centre of the beam, and is held securely between the channel member 1 and the brace 2.

The strut as herein shown is formed with a rectangular box shaped end 5, which slips over the channel beam 1, and from this box end extends a central core 4' which is of diamond shape in cross section, and the apex 6 of the angled portion is disposed centrally of the width of the strut. Arranged parallel with the flat upper faces 7 of this angle structure are flat bar members 8, which with the angle member form a pair of right angularly disposed longitudinal slots 9, and the upper bar members 8 are reinforced by longitudinal webs 10 provided with central bosses 11 to receive the pivot bolt 12, upon which the live brake lever 13 is mounted, holes 14 being provided in the longitudinal member at either side of the apex 6 to receive the inwardly extending end of the pivot bolt.

The outward end of the strut is formed with a transverse groove 15 in which the central bent portion of the brace rod 2 rests so that the strut supports the brace rod centrally of its length.

It will be understood that a strut such as described is of extremely simple construction, consisting of only one part and the arrangement of the pair of right-angularly arranged longitudinal slots opening through a central opening in the top of the strut, permits the adjustment of the brake lever in either a right or left hand position.

Further, it will be seen that the pivot bolt passing through the bar member 8 and through the diamond-shaped body portion of the strut is supported directly on each side of the brake lever slot, and being thus placed directly in shear it forms a strong and substantial support for the brake lever and the braking pressure applied to the lever is conducted in direct compression on the strut to the brake beam.

What I claim as my invention is:—

The combination with a brake beam and brace rod therefor and a brake lever and pivot pin to be variably supported therebetween, of a one-piece strut comprising a single casting formed with a solid longitudinal central core of increasing cross sectional area toward each end said strut having a rectangular box-shaped portion at one end to receive the brake beam and the other end of the strut being formed with a transverse groove to receive the brace rod, bars spaced from said central core and rigidly connecting the end portions of the strut and presenting with said central core right-angularly intersecting brake lever slots, and pivot pin openings extending through said bars and central core with their axes right-angularly intersecting centrally of the said central core, said central core presenting outer faces which are concaved longitudinally whereby to provide for the said cross-sectional increase toward each end and to accommodate the head or nut end of the pivot pin.

EARLE W. G. PATERSON.